Jan. 3, 1933.    M. BULLOUGH    1,893,396
FISH ROD FERRULE
Filed April 30, 1931
Fig.1.   Fig.2.   Fig.3.
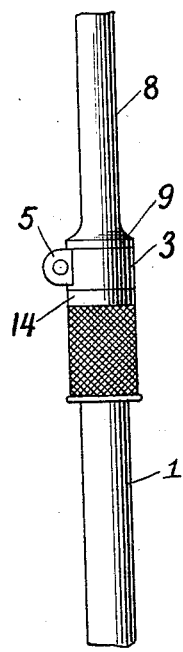 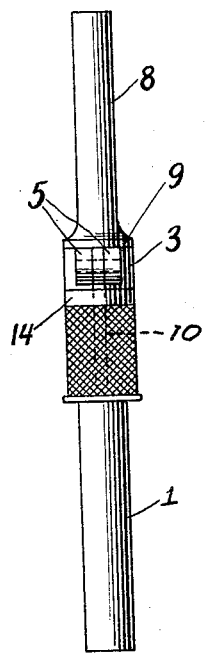 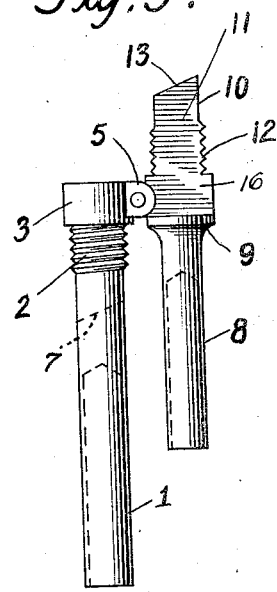
Fig.4.   Fig.5.   Fig.6.
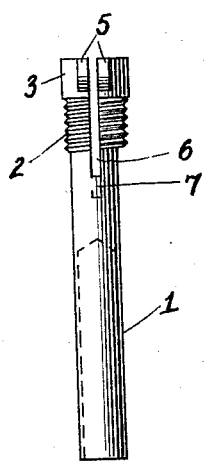 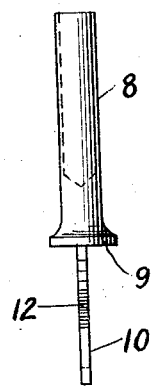 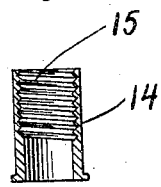
Maynard Bullough
INVENTOR
BY Victor J. Evans and Co.
ATTORNEYS
WITNESS:

Patented Jan. 3, 1933

1,893,396

UNITED STATES PATENT OFFICE

MAYNARD BULLOUGH, OF OGDEN, UTAH

FISH ROD FERRULE

Application filed April 30, 1931. Serial No. 534,065.

My present invention has reference to fishing rods, and my object is the provision of a rod which may be compactly folded so as to provide a small package that may be conveniently carried in a suitcase, satchel or trunk and wherein the rod embodies a plurality of sections connected by hinged joints of a particular, peculiar and novel construction, whereby the sections, when swung to longitudinal alinement will be locked rigidly together in an easy and efficient manner, the said locking means being also readily operated to permit of the sections being swung against each other.

To the attainment of the above broadly stated objects and others which will present themselves the improvement resides in other novel features of construction, combination and operative association of parts, one satisfactory embodiment of which is disclosed by the accompanying drawing.

In the drawing:

Figure 1 is a side elevation of two sections of a fishing line connected in accordance with this invention.

Figure 2 is a view looking at right angles to Figure 1.

Figure 3 is a view showing the sections released and swung one against the other.

Figure 4 is a front elevation of one of the sections.

Figure 5 is a similar view of the cooperating section.

Figure 6 is a sectional view through the locking sleeve.

In the showing of the drawing the improvement resides in connecting the ends of the ferrules in which the fishing rod sections are received, but when the rod sections are of metal the improvement is applied directly to the ends thereof.

Also in the showing of the drawing only two sections are illustrated but obviously the rod may be made up of any desired number of sections.

Referring now to the drawing the numeral 1 designates the end of a rod section or a ferrule in which this rod section is received. The member 1 is of metal and adjacent to its end is provided with exterior threads 2 and outward of the threads with a round head 3 provided on one of its sides with a pair of spaced ears 5. From its head the section 1 is centrally slotted for a determined distance, as at 6, and the lower or inner wall provided by the slot is arranged at an angle, as indicated by the numeral 7. This slot passes between the ears 5. The cooperating section of the ferrule 8 has its end provided with an annular flange or enlargement 9 and from thence the same is formed with a tongue 10. The tongue at its juncture with the flange or enlargement 9 is widened, as at 16, and one end of said widened part 16 is received between and is pivoted to the outwardly projecting ears 5 on the member 1. The reduced portion 11 has its edges formed with outwardly extending threads 12 to register with the threads 2 on the section 1, when the section 8 is swung into longitudinal alinement with the said section 1. When so swung the tongue 11 is received in the slot 6. The outer end of the tongue is cut angularly, as at 13, and this angle wall is designed to rest against and to frictionally contact with the inner angle 7 provided by the slot 6. The width of the reduced portion of the tongue is equal to that of the slotted portion of the member 1, below the threads thereon.

Slidable on the section 1 there is a sleeve 14. The sleeve has its outer surface milled and its bore, for a determined length is provided with threads 15. The ferrule is designed to be screwed upon the threaded portion 2 of the section 1 and to engage with the threads 12 on the tongue 11 of the section 8 and whereby the sections 1 and 8 will be rigidly and effectively held in longitudinal alinement. The non-threaded part of the bore of the sleeve contacts with the non-threaded edges of the tongue when the rod sections 1 and 8 are thus alined and, therefore, the tongue is not necessarily provided with the threads 12. By simply unscrewing the sleeve 14 the section 8 will be released from its connection with the section 1 so that the sections may be swung against each other, as disclosed by Figure 3 of the drawing. In this manner the rod is folded to produce a small package which can be readily stored in a suitcase, a fishing box, a trunk or which may be conveniently carried in the pocket of the user.

The rod sections fold from the opposite sides of the line guides and reels and, therefore, will not interfere with the free working of the line when the rod is extended. This also permits of the rod sections being folded without removing the line from the guides. The line guides are locked in alinement as will, it is thought, be apparent. The locked joint for the rod sections not only holds the sections from being accidentally removed from each other but strengthen the rod at the joint of such sections. The device is simple, and may be easily operated to either hold the rod sections in longitudinal alinement or permit of the said sections being folded against each other and it is thought the foregoing description will fully and clearly set forth the simplicity of the construction and the advantages thereof so that further detailed description will not be required.

Having described the invention, I claim:

A fishing pole made up of a plurality of sections, one of said sections having a headed end provided with a pair of spaced outstanding ears, a longitudinal slot between the ears and projecting threads below the head, the cooperating section having a flanged end, a tongue extending centrally from said flange and designed to be received in the slot, said tongue at its juncture with the flange being widened to have one of its ends received between and pivotally connected to the ears, and which tongue has its edges provided with projecting threads below the widened portion thereof and which threads are designed to register with the first-named threads when the tongue is swung into the section, and the said tongue having a non-threaded portion which projects beyond the threaded edges thereof and which non-threaded portion is of a width equalling that of the slotted portion of the first-named section beyond the threads thereof, and a sleeve slidable and revoluble on the first-named section and having a partially threaded bore to engage with the threads on the tongue and with the threads on the slotted rod section and to have the non-threaded portion of its bore contact with the non-threaded edges of the tongue to lock the sections in longitudinal alinement, the end wall of the groove and the outer end of the tongue being angular for contacting engagement when the tongue is received in the groove.

In testimony whereof I affix my signature.

MAYNARD BULLOUGH.